(12) United States Patent
Jaradi et al.

(10) Patent No.: US 12,151,636 B1
(45) Date of Patent: Nov. 26, 2024

(54) SEAT AIRBAG ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/335,365

(22) Filed: Jun. 15, 2023

(51) Int. Cl.
*B60R 21/207* (2006.01)
*B60R 21/231* (2011.01)
*B60R 21/2338* (2011.01)
*B60N 2/02* (2006.01)
*B60N 2/20* (2006.01)

(52) U.S. Cl.
CPC ...... *B60R 21/207* (2013.01); *B60R 21/23138* (2013.01); *B60R 21/2338* (2013.01); *B60N 2/0224* (2013.01); *B60N 2/20* (2013.01); *B60R 2021/23146* (2013.01)

(58) Field of Classification Search
CPC ........................ B60R 21/207; B60R 21/23138
See application file for complete search history.

(56) References Cited

U.S. PATENT DOCUMENTS

| | | | | |
|---|---|---|---|---|
| 5,464,246 A * | 11/1995 | Castro | ................... | B60R 21/207 280/730.2 |
| 5,829,827 A * | 11/1998 | Schaper | ............... | B60N 2/4279 297/216.1 |
| 6,029,993 A * | 2/2000 | Mueller | ............... | B60R 21/2338 280/730.2 |
| 9,039,035 B1 * | 5/2015 | Faruque | ................ | B60R 21/207 280/728.2 |
| 9,333,931 B1 * | 5/2016 | Cheng | ..................... | B60R 21/02 |
| 10,807,551 B2 * | 10/2020 | Deng | ..................... | B60N 2/427 |
| 10,864,878 B2 * | 12/2020 | Nagasawa | ......... | B60R 21/23138 |
| 11,318,905 B2 * | 5/2022 | Kang | .................... | B60R 21/207 |
| 11,447,086 B2 * | 9/2022 | Matsushita | ........... | B60R 21/239 |
| 11,713,014 B1 * | 8/2023 | Faruque | ............ | B60R 21/23138 280/728.1 |
| 11,912,230 B2 * | 2/2024 | Faruque | ................ | B60R 21/207 |
| 2008/0061538 A1 | 3/2008 | Mohammad et al. | | |

FOREIGN PATENT DOCUMENTS

| | | |
|---|---|---|
| CN | 100441448 C | 12/2008 |
| KR | 20210027599 A | 3/2021 |
| WO | 2022055082 A1 | 3/2022 |

OTHER PUBLICATIONS

"Pelvis Air Bags," www.mersag.com, Mar. 7, 2023, 3 pages.

* cited by examiner

*Primary Examiner* — Faye M Fleming
(74) *Attorney, Agent, or Firm* — Frank A. MacKenzie; Bejin Bieneman PLC

(57) ABSTRACT

An assembly includes a vehicle seat including a seat bottom and a seat back, and an airbag attached to the vehicle seat at a first anchor point and a second anchor point. The first anchor point is located on the seat bottom and fixed relative to the seat bottom, and the second anchor point is located on the seat back and movable along a length of the seat back.

18 Claims, 6 Drawing Sheets

SEAT AIRBAG ASSEMBLY

BACKGROUND

Vehicles are equipped with airbags. In the event of certain impacts, an inflator activates and provides inflation medium to the airbags, and the airbags pressurize to control the kinematics of occupants during the impact. The airbags are located at various positions in passenger cabins of vehicles. Vehicles typically include a driver airbag mounted in the steering wheel, a passenger airbag mounted in the dashboard in a vehicle-forward direction from the front passenger seat, and side curtain airbags mounted in the roof rails.

DETAILED DESCRIPTION

Figure 1:
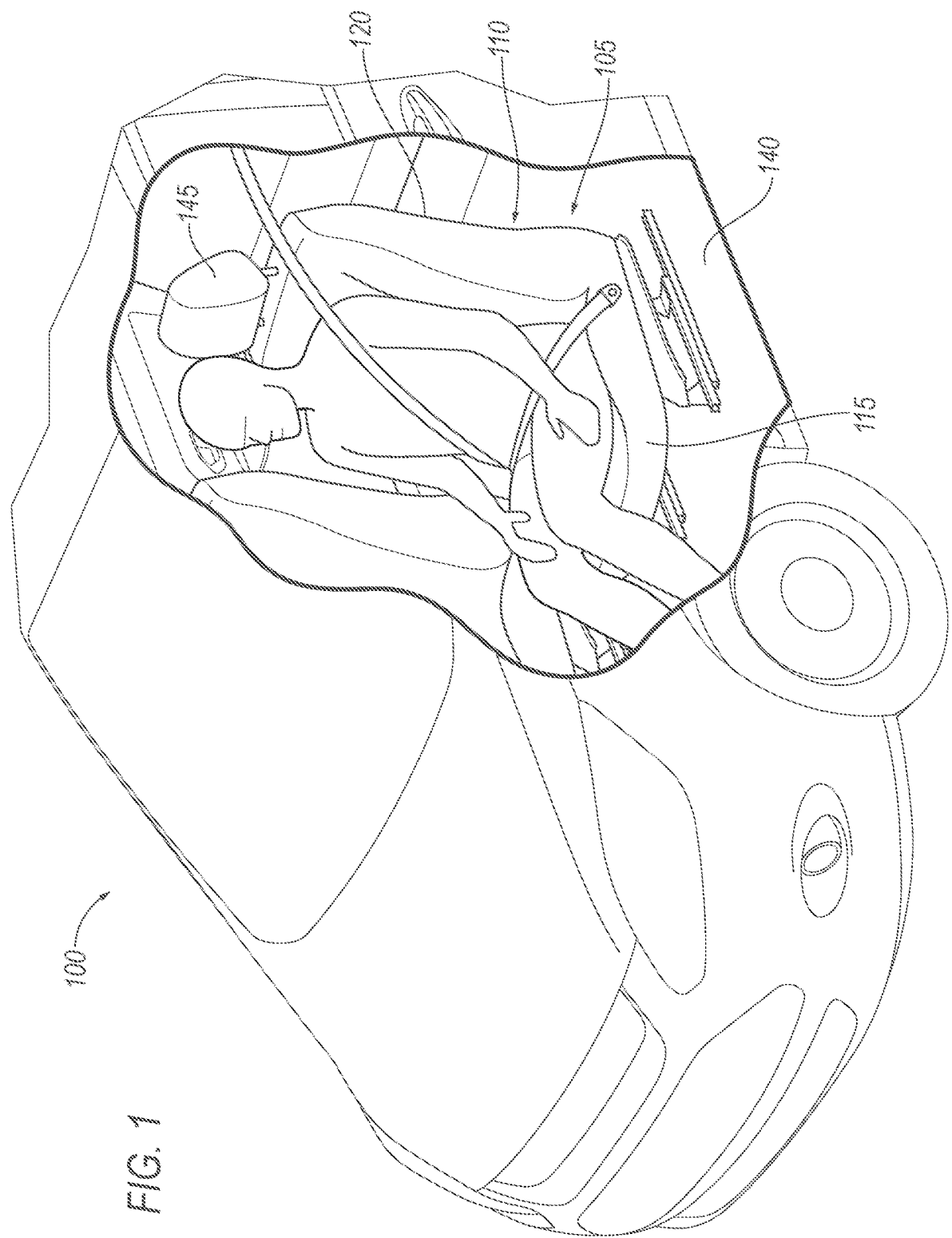
FIG. 1 is a perspective view of a portion of an example vehicle with a passenger compartment exposed for illustration.

An assembly includes a vehicle seat including a seat bottom and a seat back, and an airbag attached to the vehicle seat at a first anchor point and a second anchor point. The first anchor point is located on the seat bottom and fixed relative to the seat bottom, and the second anchor point is located on the seat back and movable along a length of the seat back.

In an example, the assembly may further include a retractor fixed to the seat back and a strap retractable into the retractor, the second anchor point being fixed to the strap. In a further example, the retractor may include a retractor housing fixed to the seat back and a spool rotatably coupled to the retractor housing, the strap being wound around the spool. In a yet further example, the retractor may include a spring coupled to the spool and coupled to the retractor housing, the spring being preloaded to apply a torque to the spool in a retractive direction.

In another yet further example, the retractor may include a locking mechanism movable between an engaged state and a disengaged state, the locking mechanism in the engaged state locking the spool to the retractor housing, and the locking mechanism in the disengaged state permitting rotation of the spool relative to the retractor housing. In a still yet further example, the locking mechanism may be configured to move from the disengaged state to the engaged state in response to a deceleration of a vehicle above a threshold.

In another further example, the airbag may be mounted to the vehicle seat at a third anchor point, the third anchor point may be located on the seat bottom and fixed relative to the seat bottom, and a distance between the third anchor point and the retractor may increase with a recline angle of the seat back.

In an example, the airbag may be inflatable to an inflated position, the airbag in the inflated position may include a top edge extending from the first anchor point to the second anchor point. In a further example, the airbag may include a tether extending along the top edge from the first anchor point to the second anchor point.

In an example, the airbag may be mounted to the vehicle seat at a third anchor point, the third anchor point being located on the seat bottom and fixed relative to the seat bottom. In a further example, the third anchor point may be closer to a joint between the seat bottom and the seat back than the first anchor point is. In a yet further example, the airbag may be inflatable to an inflated position, the airbag in the inflated position may include a top edge extending from the first anchor point to the second anchor point, and the airbag may include a tether extending from the third anchor point to the top edge. In a still yet further example, the tether may be attached to the top edge at a point spaced from the first anchor point and spaced from the second anchor point.

In another still yet further example, a length of the tether may be less than a distance between the first anchor point and the third anchor point.

In another still yet further example, a length of the tether may be less than a distance between the second anchor point and the third anchor point.

In an example, the seat bottom may include a lateral seat-bottom panel, and the first anchor point may be located on the lateral seat-bottom panel. In a further example, the airbag may be mounted to the vehicle seat at a third anchor point, the third anchor point may be located on the lateral seat-bottom panel and fixed relative to the seat bottom, and the third anchor point may be closer to a joint between the seat bottom and the seat back than the first anchor point is.

In an example, the seat back may include a lateral seat-back panel, and the second anchor point may be located on the lateral seat-back panel. In a further example, the seat bottom may include a lateral seat-bottom panel, the first anchor point may be located on the lateral seat-bottom panel, the airbag in an uninflated position may be elongated along the lateral seat-bottom panel from the first anchor to a joint between the seat back and the seat bottom and along the lateral seat-back panel from the joint to the second anchor point.

With reference to the Figures, wherein like numerals indicate like parts throughout the several views, an assembly 105 of a vehicle 100 includes a vehicle seat 110 including a seat bottom 115 and a seat back 120, and an airbag 125 attached to the vehicle seat 110 at a first anchor point 130 and a second anchor point 135. The first anchor point 130 is located on the seat bottom 115 and fixed relative to the seat bottom 115, and the second anchor point 135 is located on the seat back 120 and movable along a length of the seat back 120.

In the event of certain impacts, e.g., certain side impacts, the airbag 125 inflates from an uninflated position to an inflated position. The airbag 125 in the inflated position may be positioned next to a pelvis of an occupant of the vehicle seat 110. Anchoring the airbag 125 to both the seat bottom 115 and the seat back 120 can help the airbag 125 to restrain the pelvis from lateral movement, e.g., outboard movement. The movability of the second anchor point 135 permits the occupant to recline the seat back 120 while the airbag 125 stays anchored to both the seat bottom 115 and the seat back 120. For example, the movability of the second anchor point 135 can maintain the anchoring of the airbag 125 for relatively small recline angles of the seat back 120, e.g., less than 30° (smaller than shown in FIG. 3B), as greater recline angles are not recommended while operating the vehicle 100. The movability of the second anchor point 135 may also maintain the anchoring of the airbag 125 for greater recline angles, e.g., while the vehicle 100 is not in operation, so that the airbag 125 is still anchored to both the seat bottom 115 and the seat back 120 when the occupant raises the seat back 120 in order to operate the vehicle 100.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a passenger compartment 140 to house occupants of the vehicle 100. The passenger compartment 140 may include one or more of the vehicle seats 110 disposed in a front row of the passenger compartment 140 and one or more of the vehicle seats 110 disposed in a second row behind the front row. The passenger compartment 140 may also include vehicle seats 110 in a third-row (not shown) at a rear of the passenger cabin. The rest of this description discusses the assembly for one vehicle seat 110, but multiple or all vehicle seats 110 in the passenger compartment 140 can each have an assembly 105 as described herein. The vehicle seats 110 may be bucket seats (as shown in the Figures), bench seats, etc. The position and orientation of the vehicle seats 110 and components thereof may be adjustable by an occupant.

Each vehicle seat 110 may include the seat bottom 115, the seat back 120, and a head restraint 145. The head restraint 145 may be supported by the seat back 120 and may be stationary or movable relative to the seat back 120. The seat back 120 may be supported by the seat bottom 115 and is rotatable relative to the seat bottom 115, e.g., about a seat axis A. The seat back 120 has a length extending perpendicular to the seat axis A. The seat back 120 may include a front seat-back panel 150 and two lateral seat-back panels 155 extending from the front seat-back panel 150. The front seat-back panel 150 faces forward when the seat back 120 is in an upright position. An occupant leans their back against the front seat-back panel 150 in a normal sitting position in the vehicle seat 110. The lateral seat-back panels 155 may respectively face left and right relative to the vehicle seat 110, e.g., inboard and outboard relative to the vehicle 100. The seat bottom 115 may include a top seat-bottom panel 160 and two lateral seat-bottom panels 165. The top seat-bottom panel 160 faces upward. An occupant sits on top of the top seat-bottom panel 160 in a normal sitting position in the vehicle seat 110. The lateral seat-bottom panels 165 may respectively face left and right relative to the vehicle seat 110, e.g., inboard and outboard relative to the vehicle 100. The seat bottom 115, the seat back 120, and/or the head restraint 145 may be adjustable in multiple degrees of freedom. Specifically, the seat bottom 115, the seat back 120, and/or the head restraint 145 may themselves be adjustable, in other words, adjustable components within the seat back 120, the seat bottom 115, and/or the head restraint 145, and/or may be adjustable relative to each other.

The vehicle seat 110 includes a seat frame 170. The seat frame 170 may include tubes, beams, etc. The seat frame 170 may include a pair of longitudinal frame members in the seat bottom 115 and a pair of upright frame members in the seat back 120. The longitudinal frame members may be elongated, e.g., generally perpendicular to the seat axis A, along a forward direction. The upright frame members may be elongated, e.g., generally perpendicular to the seat axis A along the length of the seat back 120. The frame members may be spaced laterally from each other, and the seat frame 170 may include one or more cross-members extending between the frame members. The seat frame 170, including the frame members, may be of any suitable plastic material, e.g., carbon fiber reinforced plastic (CFRP), glass fiber-reinforced semi-finished thermoplastic composite (organosheet), etc. As another example, some or all components of the seat frame 170 may be formed of a suitable metal, e.g., steel, aluminum, etc.

The seat back 120 is rotatable, e.g., pivotable, relative to the seat bottom 115 to a plurality of angular positions. In other words, the seat back 120 may be disposed in any suitable angular position relative to the seat bottom 115. The seat back 120 is rotatable about the seat axis A relative to the seat bottom 115. For example, the seat back 120 may be in an upright position. In other words, the seat back 120 may be generally upright, i.e., orthogonal, relative to the seat bottom 115, as shown in FIGS. 2A-3A. As another example, the seat back 120 may be in a reclined position. In other words, the seat back 120 may be reclined relative to the seat bottom 115, as shown in FIG. 3B, e.g., when the vehicle 100 is not in operation. In such an example, the seat back 120 may be oblique, i.e., neither parallel nor perpendicular, to the seat bottom 115.

The vehicle seat 110 includes a covering 175. The covering 175 may include cushions or padding covered with upholstery. The cushions may be made of cushioning material, e.g., foam or any other suitable supportive material. The upholstery may be formed of cloth, leather, faux leather, or any other suitable material. The upholstery may be stitched in panels around the foam.

The seat back 120 and the seat bottom 115 of the vehicle seat 110 define an occupant seating area of the vehicle seat 110. The occupant seating area is the area occupied by an occupant when properly seated on the seat bottom 115 and the seat back 120. The occupant seating area is in a seat-forward direction of the seat back 120 and above the seat bottom 115, e.g., directly between the front seat-back panel 150 and the top seat-bottom panel 160.

Figure 2A:
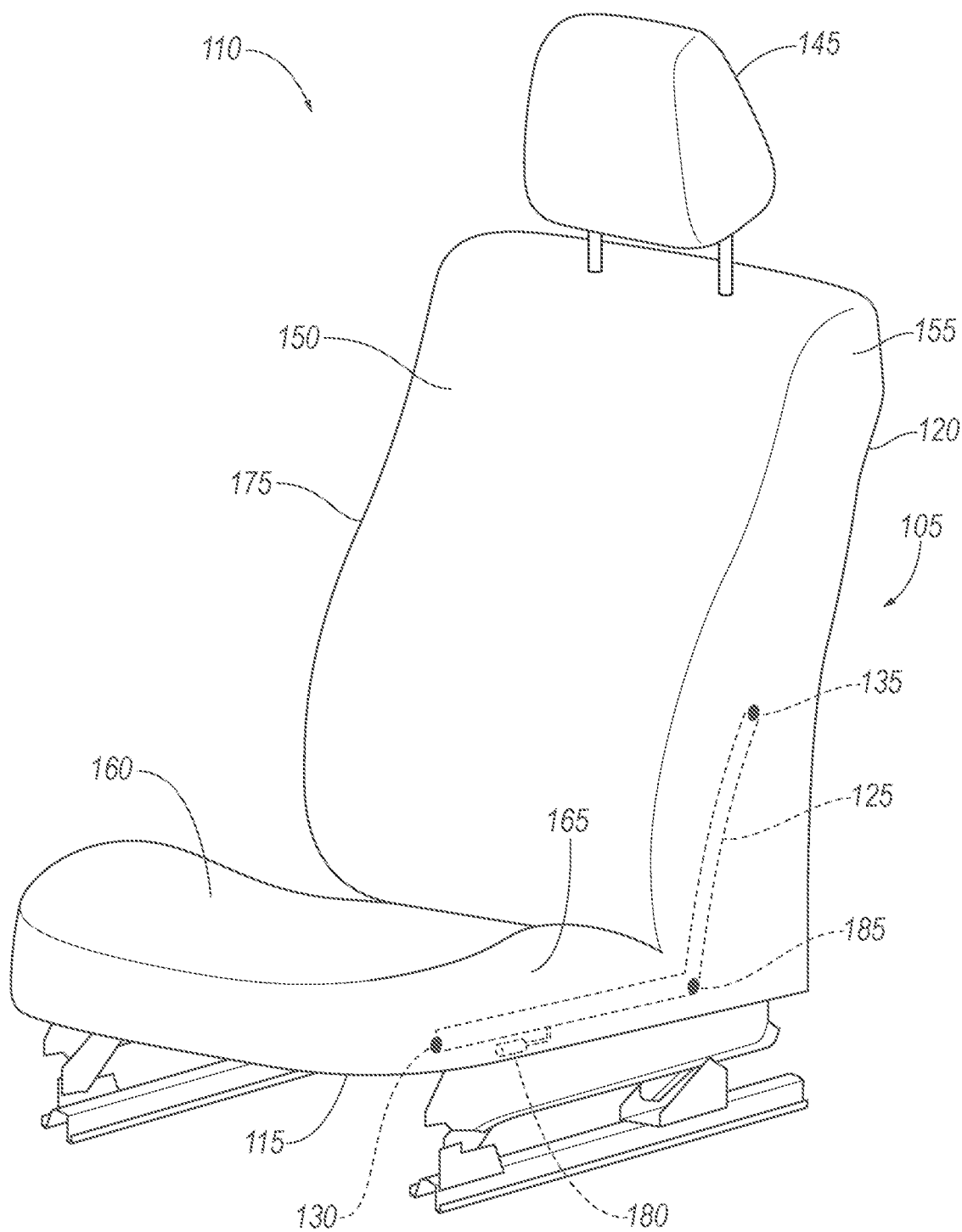
FIG. 2A is a perspective view of an example seat of the vehicle with an airbag in an uninflated position.
Figure 2B:
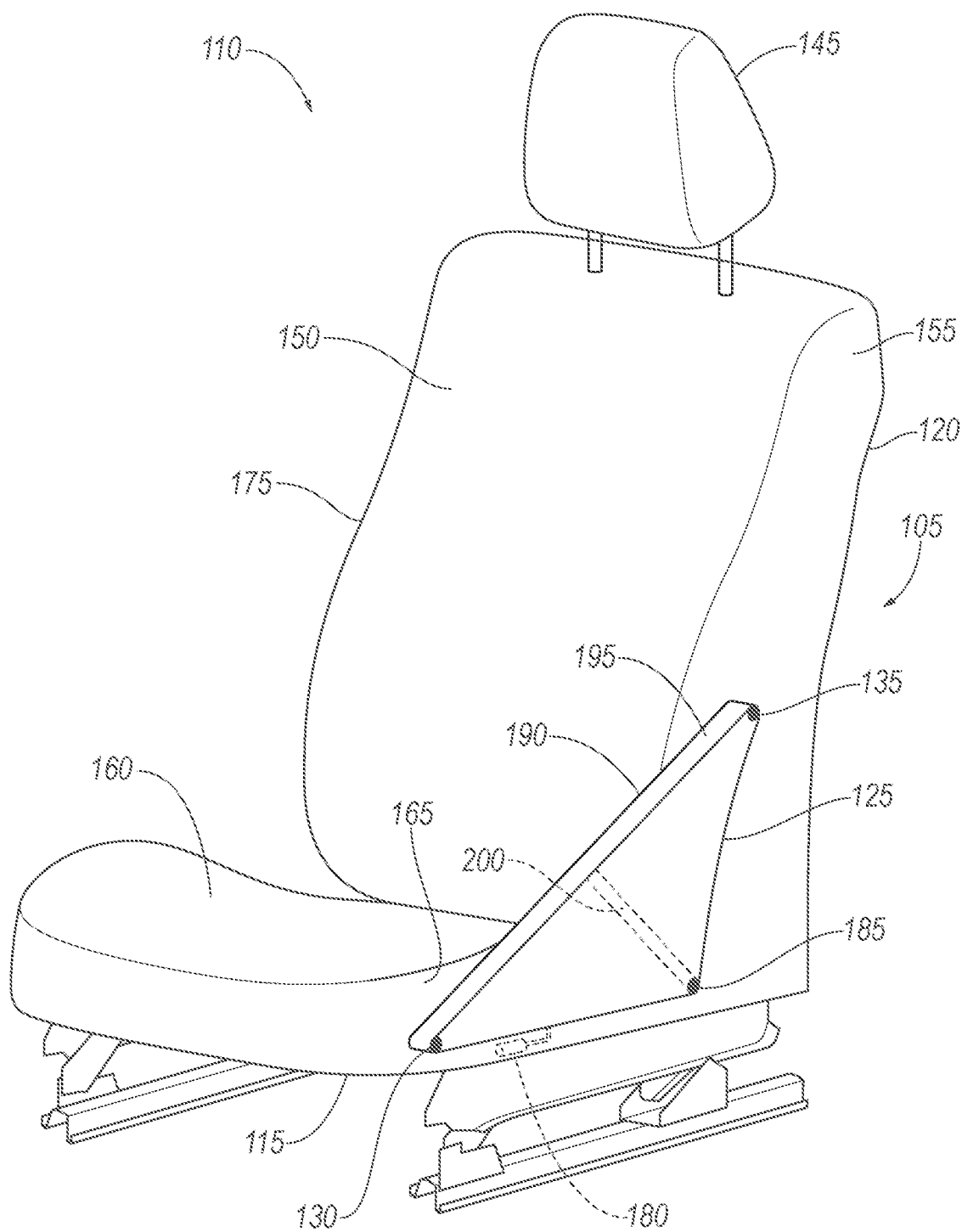
FIG. 2B is a perspective view of the seat with the airbag in an inflated position.

With reference to FIGS. 2A-B, the airbag 125 may be formed of any suitable airbag material, for example, a woven polymer. For example, the airbag 125 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The assembly 105 may include an inflator 180 connected to the airbag 125. Upon receiving a signal from, e.g., a computer (not shown), the inflator 180 may inflate the airbag 125 with an inflation medium, such as a gas. The inflator 180 may be, for example, a pyrotechnic inflator that uses a chemical reaction to drive inflation medium to the airbag 125. The inflator 180 may be of any suitable type, for example, cold-gas inflators.

The airbag 125 is attached to the vehicle seat 110 at a plurality of anchor points 130, 135, 185 including at least the first anchor point 130 and the second anchor point 135. The anchor points 130, 135, 185 may further include a third anchor point 185 and possibly other anchor points. Each anchor point 130, 135, 185 is a location of an attachment of the airbag 125 to the vehicle seat 110. When the airbag 125 inflates to the inflated position, the anchor points 130, 135, 185 hold the airbag 125 in place. When outside pressure is applied to the airbag 125 in the inflated position, the anchor points 130, 135, 185 restrict the movement of the airbag 125. For example, the airbag 125 may be fastened and/or sewn to the anchor points 130, 135, 185.

The first anchor point 130 is located on the seat bottom 115, e.g., on one of the lateral seat-bottom panels 165 such as an outboard lateral seat-bottom panel 165. The first anchor point 130 is spaced from the seat axis A, e.g., by at least a third of a length of the seat bottom 115. The first anchor point 130 may also be spaced from a front edge of the seat bottom 115. For example, the first anchor point 130 may be located in a middle third longitudinally of the seat bottom 115, specifically of the lateral seat-bottom panel 165. The first anchor point 130 is fixed relative to the seat bottom 115, i.e., prevented from moving relative to the seat bottom 115. For example, the first anchor point 130 may be fixedly attached to the seat frame 170 of the seat bottom 115 underneath the covering 175 on the lateral seat-bottom panel 165.

The third anchor point 185 is located on the seat bottom 115, e.g., on one of the lateral seat-bottom panels 165 such as an outboard lateral seat-bottom panel 165. The third anchor point 185 is located on a same lateral seat-bottom panel 165 as the first anchor point 130 is. The third anchor point 185 is closer to a joint between the seat bottom 115 and the seat back 120, i.e., is closer to the seat axis A, than the first anchor point 130 is. For example, the third anchor point 185 may be located less than a third of the length of the seat bottom 115 from the seat axis A, e.g., may be located adjacent to the seat axis A. The third anchor point 185 is fixed relative to the seat bottom 115, i.e., prevented from moving relative to the seat bottom 115. For example, the third anchor point 185 may be fixedly attached to the seat frame 170 of the seat bottom 115 underneath the covering 175 on the lateral seat-bottom panel 165.

The second anchor point 135 is located on the seat back 120, e.g., on one of the lateral seat-back panels 155 such as an outboard lateral seat-back panel 155. The second anchor point 135 is located on a same lateral side of the vehicle seat 110 as the first anchor point 130 is. As will be described below, the second anchor point 135 is movable along a length of the seat back 120. Specifically, the second anchor point 135 may be configured to move down the seat back 120 as the recline angle of the seat back 120 increases, and the second anchor point 135 may be configured to move up the seat back 120 as the recline angle of the seat back 120 decreases. The second anchor point 135 may be configured to remain stationary when the airbag 125 inflates. The second anchor point 135 may be located at or below a point halfway along the length of the seat back 120 when the seat back 120 is fully upright; i.e., a maximum height of the second anchor point 135 is at or below the point halfway along the length of the seat back 120. This position permits the airbag 125 to help restrain the pelvis of the occupant.

The airbag 125 is inflatable by the inflator 180 from the uninflated position, as shown in FIG. 2A, to the inflated position, as shown in FIG. 2B. The airbag 125 in the uninflated position is elongated along the lateral seat-bottom panel 165 from the first anchor point 130 to a joint between the seat back 120 and the seat bottom 115, i.e., the seat axis A, e.g., the third anchor point 185, and the airbag 125 in the uninflated position is further elongated along the lateral seat-back panel 155 from the joint to the second anchor point 135. The airbag 125 in the uninflated position may have a fixed length between the first anchor point 130 and the third anchor point 185 and between the third anchor point 185 and the second anchor point 135. The airbag 125 in the uninflated position is located inside or underneath the covering 175 of the vehicle seat 110. The covering 175 may include one or more tearaway seams that are opened by the inflation of the airbag 125.

The airbag 125 in the inflated position is positioned laterally from an occupant sitting in the vehicle seat 110, e.g., between the occupant seating area and a door of the vehicle 100 in a cross-vehicle direction. Specifically, the airbag 125 in the inflated position may be positioned laterally from a pelvis of the occupant sitting in the vehicle seat 110. The airbag 125 in the inflated position may have a roughly triangular shape with vertices at the first anchor point 130, the second anchor point 135, and the third anchor point 185. The airbag 125 in the inflated position includes a top edge 190 extending from the first anchor point 130 to the second anchor point 135, i.e., the top edge 190 forms the side of the triangular shape extending between the first anchor point 130 and the second anchor point 135.

The airbag 125 may include a first tether 195 extending along the top edge 190 from the first anchor point 130 to the second anchor point 135. The first tether 195 may be attached at the first anchor point 130 and the second anchor point 135 and be elongated from the first anchor point 130 to the second anchor point 135. The first tether 195 may be a fabric strap, e.g., of a same fabric as the airbag 125. The first tether 195 may be sewn to the airbag 125 along the top edge 190. The first tether 195 may reinforce the top edge 190 and may decrease a quantity of stretch or deformation of the top edge 190 when something presses against the airbag 125 in the inflated position.

The airbag 125 may include a second tether 200 extending from the third anchor point 185 to the top edge 190. The second tether 200 may be attached at the third anchor point 185 and to the top edge 190 at a point spaced from the first anchor point 130 and spaced from the second anchor point 135. A length of the second tether 200 may be less than a distance between the first anchor point 130 and the third anchor point 185 and less than a distance between the second anchor point 135 and the third anchor point 185. This positioning of the second tether 200 may thus enforce a triangular shape for the airbag 125 and increase a stiffness of the airbag 125.

Figure 3A:
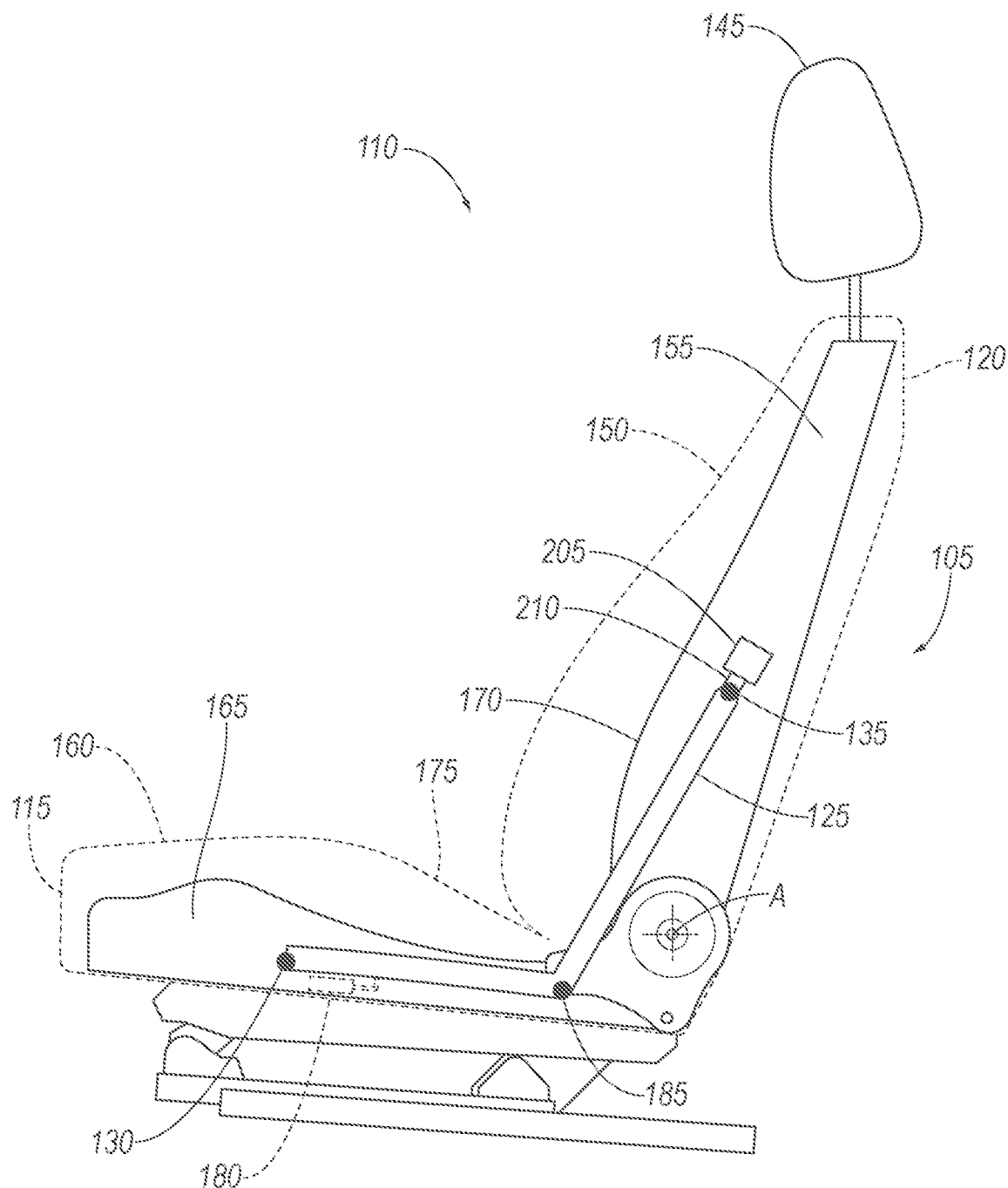
FIG. 3A is a side view of the seat with a seat back in an upright position.
Figure 3B:
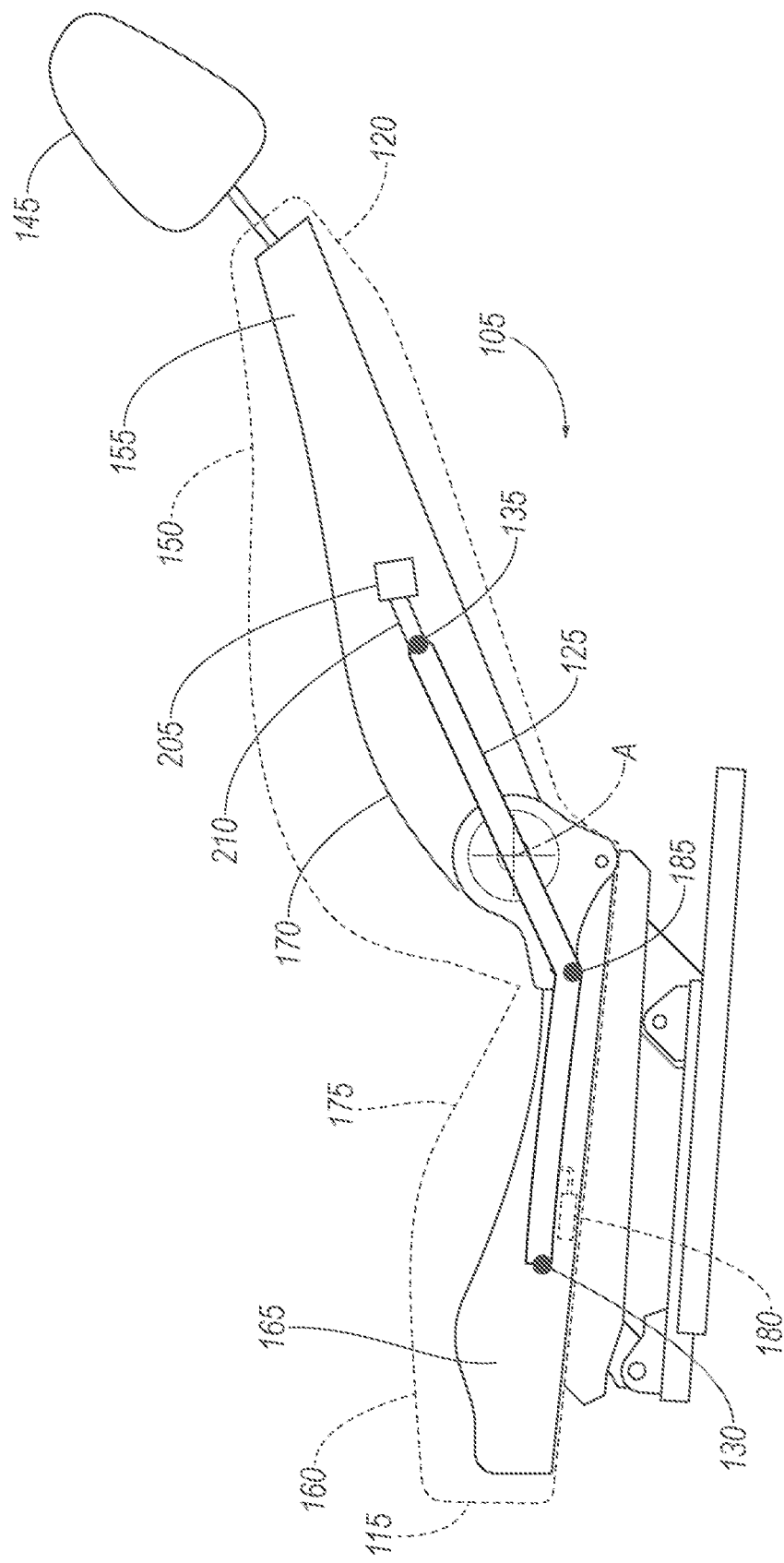
FIG. 3B is a side view of the seat with the seat back in a reclined position.

With reference to FIGS. 3A-B, the assembly 105 may include a retractor 205. The retractor 205 is distinct from a retractor for a seatbelt (not shown) of the vehicle seat 110 and is not engaged with the seatbelt. The retractor 205 is fixed to the seat back 120, e.g., fixedly mounted to the seat frame 170 of the seat back 120, e.g., on the lateral seat-back panel 155. The retractor 205 may be positioned approximately halfway up the seat back 120, above the second anchor point 135. The retractor 205 is positioned such that a distance between the third anchor point 185 and the retractor 205 increases with a recline angle of the seat back 120. In other words, as the seat back 120 reclines farther, e.g., from the position shown in FIG. 3A to the position shown in FIG. 3B, the distance between the third anchor point 185 and the retractor 205 becomes longer.

The assembly 105 may include a strap 210 retractable into the retractor 205. The strap 210 may extend from a first end feeding into the retractor 205 to a second end to which the second anchor point 135 is fixed. The strap 210 may be fabric, e.g., seatbelt webbing. As the seat back 120 reclines, the retractor 205 travels farther away from the third anchor point 185, but the airbag 125 in the uninflated position has a fixed length between the third anchor point 185 and the second anchor point 135. The airbag 125 thus pulls the strap 210 via the second anchor point 135, causing extraction of the strap 210 from the retractor 205. As the seat back 120 returns forward, the strap 210 retracts back into the retractor 205, maintaining the fixed length of the airbag 125 from the third anchor point 185 to the second anchor point 135.

Figure 4:
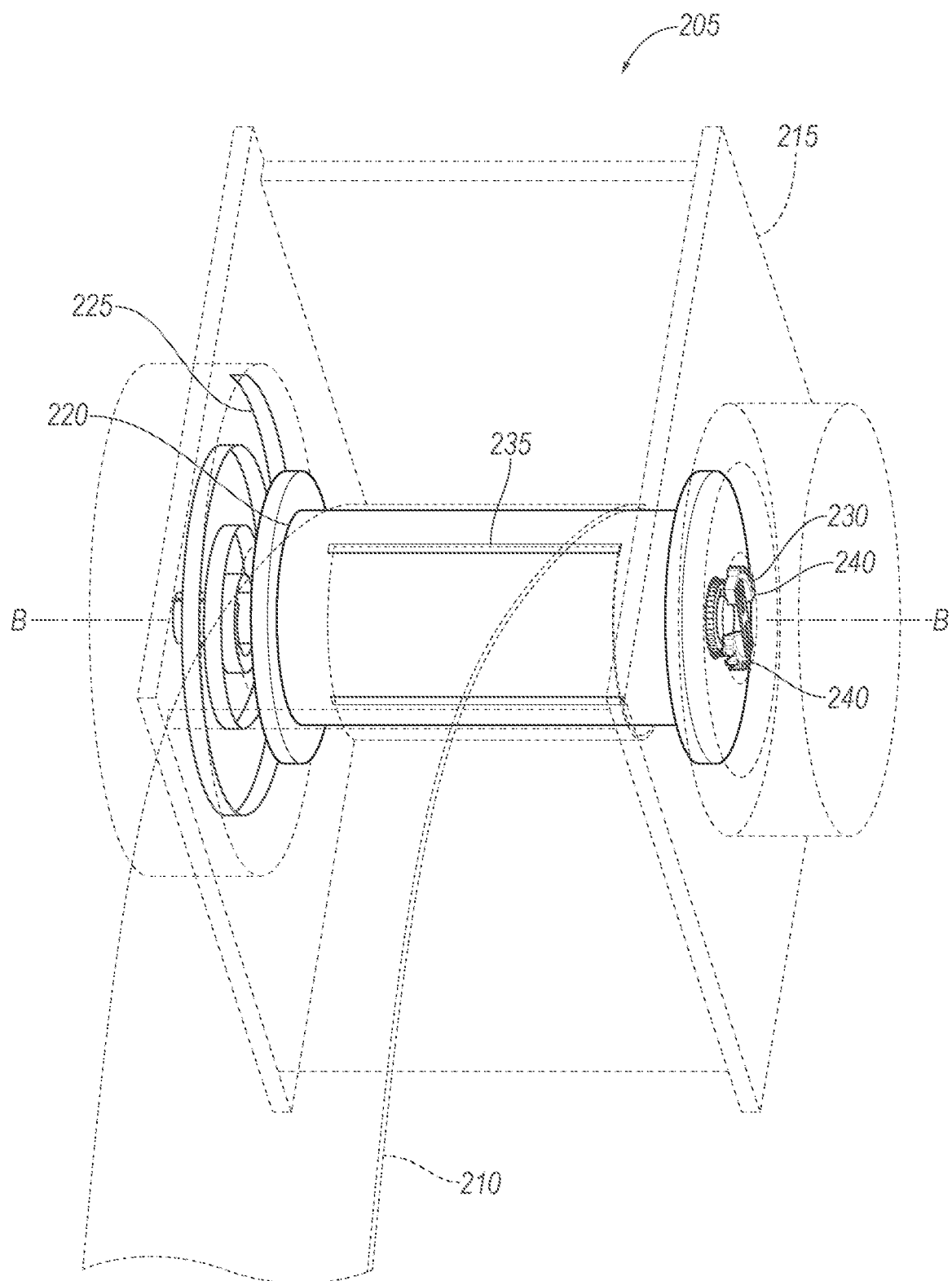
FIG. 4 is a perspective view of an example retractor of the seat.

With reference to FIG. 4, the retractor 205 may include a retractor housing 215, a spool 220, a spring 225, and a locking mechanism 230. The retractor housing 215 may be formed of metal or plastic. The retractor housing 215 may be fixed to the seat back 120, e.g., fixedly mounted to the seat frame 170 of the seat back 120, e.g., on the lateral seat-back panel 155.

The spool 220 is rotatably coupled to the retractor housing 215. The spool 220 can freely rotate relative to the retractor housing 215, and is fixed to the retractor housing 215 in all other degrees of freedom. The spool 220 can be cylindrical in shape. The spool 220 defines a spool axis B, about which the spool 220 rotates. The spool 220 extends along the spool axis B from a first end to a second end. The spool 220 may include flanges at the first end and at the second end.

The spool 220 can be adapted to receive the strap 210, for example, by including a slot 235 and permitting the strap 210 to wind around an outside of the spool 220 starting from the slot 235. The slot 235 is elongated parallel to the spool axis B. The strap 210 extends from outside the spool 220 through the slot 235. The strap 210 extends from the slot 235 in a circumferential direction and is wound around the spool 220.

The spring 225 is coupled to the spool 220 and to the retractor housing 215. The spring 225 is preloaded to apply a torque to the spool 220 in a retractive direction, i.e., a direction tending to retract the strap 210. The spring 225 may be loaded in tension or compression when the strap 210 is fully retracted, and the spring 225 may be further loaded in either tension or compression when the strap 210 is extracted from the spool 220. Thus, the spring 225 exerts a torque in the retractive direction. The spring 225 may be a coil spring, which is suitable for rotational biasing and packages well in the retractor 205, or any other suitable type of spring.

The retractor 205 may be an emergency locking retractor (ELR). In such an example, the locking mechanism 230 is movable between an engaged state and a disengaged state. In the engaged state, the locking mechanism 230 locks the spool 220 to the retractor housing 215. In the disengaged state, the locking mechanism 230 permits rotation of the spool 220 relative to the retractor housing 215. For example, the locking mechanism 230 may include one or more locking members 240 slidingly or pivotally attached to the spool 220 to permit radially outward movement relative to the spool 220. Each locking member 240 may include a plurality of teeth engageable with corresponding recesses of the retractor housing 215 (not shown) when the locking member 240 moves radially outward. The locking members 240 when engaged prevent rotational movement by the spool 220 relative to the retractor housing 215.

The locking mechanism 230 may be configured to move from the disengaged state to the engaged state in response to a deceleration of the vehicle 100 above a threshold. The retractor 205 may include an activation sensor (not shown) that senses sudden deceleration of the vehicle 100 and triggers activation of the locking mechanism 230 to engage the retractor housing 215, i.e., to move the locking mechanism 230 from the disengaged state to the engaged state. The activation sensor may be in communication with the locking mechanism 230, either directly or indirectly through a controller (not shown). The activation sensor may be located in the retractor 205 or elsewhere in the vehicle 100. In the retractor 205, the activation sensor may be, for example, a weighted pendulum, a centrifugal clutch, or any other suitable type. The activation member may also be a centrifugal effect acting on the locking members 240. In the vehicle 100 outside the retractor 205, the activation sensor may be, for example, post-contact sensors such as accelerometers, pressure sensors, and contact switches; pre-impact sensors such as radar, LIDAR, and vision-sensing systems; or any other suitable type. The vision systems may include one or more cameras, CCD image sensors, CMOS image sensors, etc.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described. Operations, systems, and methods described herein should always be implemented and/or performed in accordance with an applicable owner's/user's manual and/or safety guidelines.

What is claimed is:

1. An assembly comprising:
    a vehicle seat including a seat bottom and a seat back; and
    an airbag attached to the vehicle seat at a first anchor point and a second anchor point;
    the first anchor point being located on the seat bottom and fixed relative to the seat bottom;
    the second anchor point being located on the seat back and movable along a length of the seat back;
    a retractor fixed to the seat back; and
    a strap retractable into the retractor, the second anchor point being fixed to the strap.

2. The assembly of claim 1, wherein the retractor includes a retractor housing fixed to the seat back and a spool rotatably coupled to the retractor housing, the strap being wound around the spool.

3. The assembly of claim 2, wherein the retractor includes a spring coupled to the spool and coupled to the retractor housing, the spring being preloaded to apply a torque to the spool in a retractive direction.

4. The assembly of claim 2, wherein the retractor includes a locking mechanism movable between an engaged state and a disengaged state, the locking mechanism in the engaged state locking the spool to the retractor housing, and the locking mechanism in the disengaged state permitting rotation of the spool relative to the retractor housing.

5. The assembly of claim 4, wherein the locking mechanism is configured to move from the disengaged state to the engaged state in response to a deceleration of a vehicle above a threshold.

6. The assembly of claim 1, wherein the airbag is mounted to the vehicle seat at a third anchor point, the third anchor point is located on the seat bottom and fixed relative to the seat bottom, and a distance between the third anchor point and the retractor increases with a recline angle of the seat back.

7. The assembly of claim 1, wherein the airbag is inflatable to an inflated position, and the airbag in the inflated position includes a top edge extending from the first anchor point to the second anchor point.

8. The assembly of claim 7, wherein the airbag includes a tether extending along the top edge from the first anchor point to the second anchor point.

9. The assembly of claim 1, wherein the airbag is mounted to the vehicle seat at a third anchor point, the third anchor point being located on the seat bottom and fixed relative to the seat bottom.

10. The assembly of claim 9, wherein the third anchor point is closer to a joint between the seat bottom and the seat back than the first anchor point is.

11. The assembly of claim 10, wherein the airbag is inflatable to an inflated position, the airbag in the inflated position includes a top edge extending from the first anchor point to the second anchor point, and the airbag includes a tether extending from the third anchor point to the top edge.

12. The assembly of claim 11, wherein the tether is attached to the top edge at a point spaced from the first anchor point and spaced from the second anchor point.

13. The assembly of claim 11, wherein a length of the tether is less than a distance between the first anchor point and the third anchor point.

14. The assembly of claim 11, wherein a length of the tether is less than a distance between the second anchor point and the third anchor point.

15. The assembly of claim 1, wherein the seat bottom includes a lateral seat-bottom panel, and the first anchor point is located on the lateral seat-bottom panel.

16. The assembly of claim 15, wherein the airbag is mounted to the vehicle seat at a third anchor point, the third anchor point is located on the lateral seat-bottom panel and fixed relative to the seat bottom, and the third anchor point is closer to a joint between the seat bottom and the seat back than the first anchor point is.

17. The assembly of claim 1, wherein the seat back includes a lateral seat-back panel, and the second anchor point is located on the lateral seat-back panel.

18. The assembly of claim 17, wherein the seat bottom includes a lateral seat-bottom panel, the first anchor point is located on the lateral seat-bottom panel, the airbag in an uninflated position is elongated along the lateral seat-bottom panel from the first anchor to a joint between the seat back and the seat bottom and along the lateral seat-back panel from the joint to the second anchor point.

* * * * *